United States Patent Office 2,993,813
Patented July 25, 1961

2,993,813
PROCESS OF COATING A SUBSTRATE WITH POLYURETHANE FOAM
Wilhelm Tischbein, Leverkusen, Germany, assignor by direct and mesne assignments of one-half to Farbenfabriken Bayer Aktiengesellschaft, Leverkusen, Germany, a corporation of Germany, and of one-half to Mobay Chemical Company, Pittsburgh, Pa., a corporation of Delaware
No Drawing. Filed Feb. 26, 1957, Ser. No. 642,360
Claims priority, application Germany Feb. 29, 1956
9 Claims. (Cl. 117—161)

This invention relates to a process for coating threads, ribbons, wires, fabrics, sheets and the like with isocyanate foam.

It is well known to produce isocyanate foam by reacting polyhydroxyl compounds with polyisocyanates and water or by reacting polycarboxylic compounds with polyisocyanates. In carrying out these reactions, the components are mixed (see U.S. Patent 2,764,565) and the liquid foamable mixture thus produced is poured into a suitable receptacle where conversion into a solid plastic foam takes place. In this manner it is possible to produce blocks of isocyanate foam which can be cut with knives or glowing wires to obtain threads, ribbons, sheets and the like consisting of plastic foam. The foam threads and ribbons can be made into fabrics by weaving, knitting, knotting or other suitable means. The fabrics thus obtained exhibit very good heat-insulating properties but suffer from the disadvantage of having insufficient mechanical strength.

In order to obtain fabrics which combine good heat-insulating properties with satisfactory mechanical strength, it has been proposed to coat threads or ribbons made of conventional fibers with isocyanate foam. This can be done by applying the liquid foamable mixture referred to above to the thread or ribbon to be coated. The foamable mixture reacts on the thread or ribbon to form a solid isocyanate foam surrounding the thread or ribbon but ordinarily the foam wrap thus obtained is not of even thickness. Coating by dipping, which gives excellent results in the lacquering and impregnation of threads, wires, fabrics and sheets could not be used to coat these articles with isocyanate foam since the liquid foamable mixture obtained upon mixing the components immediately reacts to form a solid material and cannot be stored in a plunge bath or other equipment suitable for carrying out the dipping process. For the same reason, it was not possible heretofore to apply foamable mixtures capable of yielding solid isocyanate foam by means of coating knives or coating rollers.

It is, therefore, an object of the present invention to provide a process for coating threads, ribbons, wires, fabrics, sheets and the like with an even and uniform cover of isocyanate foam. Another object of the invention is to provide a foamable mixture which when applied to a thread, ribbon, wire, fabric, sheet and the like yields an even cover of solid isocyanate foam. Further objects will appear hereinafter.

In accordance with this invention, generally speaking, the foregoing objects and others are accomplished by applying to the thread, ribbon, wire, sheet, fabric or other article which is to be coated a foamable mixture comprising a polyhydroxy compound, water, and a polyisocyanate selected from the group consisting of dicyclohexylmethane - 4,4′ - diisocyanate, 1,4-cyclohexylene diisocyanate, hexamethylene diisocyanate, and blocked isocyanates, and subsequently subjecting the material coated with said mixture to a heat-treatment.

The process of the invention is based on the discovery that foamable mixtures capable of yielding a plastic isocyanate foam are storable at room temperature for hours if the polyisocyanate component of the mixture is a member selected from the group consisting of dicyclohexylmethane-4,4′-diisocyanate, 1,4-cyclohexylene diisocyanate, hexamethylene diisocyanate, and blocked isocyanates. When using such a mixture, it is possible to coat a thread, ribbon, wire, fabric, sheet or similar article without any reaction taking place at room temperature. Not until the material coated with such a mixture is heated, the reactions leading to the formation of isocyanate foam take place and, as a result, the coated article is covered with a plastic urethane foam.

The process of the invention is applicable to threads, ribbons, wires, sheets, fabrics and the like formed from any desired material, such as natural fibers including wool and cotton; synthetic fibers including acetyl cellulose, polyamides and polyacrylo nitrile; glass; metal and plastics. Moreover, the process of the invention makes it possible to coat the above articles either on one side or on all sides.

In carrying out the process of the invention, the threads, ribbons, wires, sheets, fabrics or other articles to be coated are dipped once or several times into a foamable mixture containing as the polyisocyanate component one of the above-cited polyisocyanates. The foamable mixture may be contained in a plunge bath and a wiper mounted above the bath may be used to control the quantity of the foamable mixture to be applied to the article. In this manner, it is possible to adjust the thickness and uniformity of the coat. Generally, it is advantageous to use relatively small plunge baths and to replenish the bath from time to time with a fresh foamable mixture.

According to another embodiment of the process of the invention, the foamable mixture is applied by means of a coating knife or roller coater to cover a fabric or sheet on one side.

After applying one or several coats of foamable mixture the coated article is subjected to a heat-treatment in order to bring about conversion of the foamable mixture adhering to the article into a solid isocyanate foam. This heat-treatment may most conveniently be carried out by passing the coated article through a heat-channel having a temperature of about 200° to about 300° C. If this heat-channel has a length of about 0.5 to 2 meters, it is possible to move the article through the channel at a speed of about 1 to 5 meters per minute. The heat-channel may be of any suitable design and the heating may be effected by hot air or by infra-red rays.

Upon leaving the heat-channel, the material is covered with a solid nontacky isocyanate foam. It may be cooled by blowing with cold air and wound around a spool or roller for storage.

The foamable mixtures used in the practice of the invention comprise, as stated above, a polyhydroxy compound, water, and a specific polyisocyanate.

As the polyhydroxy compound, there may be employed any polyhydroxy compound commonly utilized in the production of isocyanate foam, such as hydroxyl polyesters obtained by thermal esterification of polybasic organic acids with polyhydric alcohols, isocyanate-modified polyesters containing terminal hydroxyl groups and prepared by reacting an hydroxyl polyester with 1–5% of a diisocyanate, polyhydroxyl ethers obtained, for example, by polymerization of alkylene oxides or oxalkylation of polyhydric alcohols, hydroxyl polythioethers obtained, for example, by etherification of thioether glycols, and hydrogenation products of carbon monoxide-ethylene copolymers. It is within the scope of the present invention to employ, if desired, an activator together with the polyhydroxy and isocyanate reactants. The activators used to make up the foamable mixtures suitable for use in the process of the invention are those which are commonly employed in the production of isocyanate foam. These activators mostly comprise mixtures of accelerating agents, such as tertiary amines and heavy metal compounds, with surface active agents, such as sulfonation products of fatty alcohols and fatty acids or salts of amines with fatty acids.

As the specific polyisocyanate component, there is employed a member selected from the group consisting of dicyclohexylmethane-4,4' - diisocyanate, 1,4 - cyclohexylene diisocyanate, hexamethylene diisocyanate, and blocked isocyanates. In addition to this specific polyisocyanate component, the foamable mixture may contain up to 60% by weight, based on the weight of total isocyanate, of a polyisocyanate commonly used in the production of isocyanate foam, such as 2,4 - toluylene diisocyanate, 2,6-toluylene diisocyanate, technical mixtures of 2,4- and 2,6-toluylene diisocyanate and 1,4-phenylene diisocyanate.

The blocked isocyanates which can be used as the specific polyisocyanate component of the foamable mixtures used in the process of the invention are reaction products of organic polyisocyanates which can be split into the underlying free polyisocyanates by heating to temperatures above 100° C. Examples of organic compounds which react with polyisocyanates to form blocked isocyanates include phenols, naphthols, oximes, imides, diphenyl amine, phenyl methyl pyrazolone, caprolactam, malonic acid esters, acetoacetic ester and acetylacetone (see O. Bayer, Angew. Chemie A 59, p. 257 et seq. (1947) and U.S. Patents 2,725,385 and 2,733,261).

In preparing the foamable mixture, the components are mixed in the commonly employed proportions. Ordinarily, 0.5 to 1.5 mols of diisocyanate is used per gram equivalent of OH contained in the polyhydroxy compound and to the mixture there are added 0.5 to 10% by weight of water, 0.5 to 10% by weight of an emulsifier and 0.1 to 4% by weight of an accelerator, the percentages being based on the weight of the polyhydroxy compound. Rather than adding the polyhydroxy compound and the polyisocyanate component separately, it is also possible to form from these two components a so-called prepolymer and to add to this polymer the required amounts of water, and if desired, emulsifier and accelerator.

In order to increase the stability of the foamable mixtures used in the practice of the invention, a small amount, say 0.5 to 1% by weight, based on the weight of the polyhydroxy compound, of an acid chloride, such as acetyl chloride or phthaloyl chloride, can be added thereto.

Details on the chemicals and reaction conditions commonly used in the production of isocyanate foam have been published in the literature, such as De Bell, Goggin and Gloor, "German Plastics Practice," Murray Printing Co., 1946; A. Höchtlen, "Kunststoffe" 40 (1950), pp. 3–14; U.S. Patents 2,577,279; 2,577,280 and 2,764,565. These publications are incorporated herein by reference.

The coated threads and ribbons obtained by the process of the invention are eminently suitable for making fabrics or similar articles having excellent heat-insulation properties and at the same time sufficient mechanical strength. Such fabrics as well as conventional fabrics coated with polyurethane foam by the process of the invention can be employed for making clothing suitable for use in cold climates. Foam-coated wires can be used, for instance, as fishing-rods.

The invention is further illustrated by the following examples without being restricted thereto.

Example 1

120 parts of a polyester obtained by thermal esterification of 16 mols of adipic acid with 16 mols of diethylene glycol and 1 mol of trimethylol propane (hydroxyl number, 60; acid number, 1) are mixed with 7.5 parts of a mixture prepared from 3 parts of stannous chloride, 10 parts of diethyl ammonium oleate, 2 parts of phthaloyl chloride and 35 parts of water. To the mixture there are added 33 parts of a mixture consisting of toluylene diisocyanate and dicyclohexylmethane-4,4'-diisocyanate (weight ratio 1:1). The foamable mixture thus obtained is placed in a plunge bath. A cotton, rayon, glass or polyamide thread is passed through the mixture at such a rate as to be submerged for 1 to 2 seconds. After being coated with the foamable mixture, the thread is passed at a speed of 3 meters per minute through a heat-channel having a temperature of 260° C. and a length of 1 to 2 meters. In this manner there is obtained a thread surrounded with polyurethane foam. Upon cooling by blowing with cold air, the foam-coated thread is wound upon a spool.

Example 2

The polyester described in Example 1 is mixed with 3% of toluylene diisocyanate. 120 parts of the isocyanate-modified polyester thus obtained are mixed with 7.5 parts of the aqueous mixture described in Example 1 and to the resulting mixture there are added 33 parts of a mixture containing toluylene diisocyanate and dicyclohexylmethane-4,4'-diisocyanate in the weight ratio 1:1.

A polyamide fabric or a plastic foil is dipped into the foamable mixture thus prepared and then treated with hot air. Due to the modification of the polyester with an isocyanate, the viscosity of the foamable mixture is increased and at the same time the foaming taking place under the action of the hot air is accelerated.

Eaxmple 3

The procedure described in Example 1 is followed except that in place of the toluylene diisocyanate-dicyclohexylmethane-4,4'-diisocyanate mixture there is used 70 parts of a 50% solution of dicyclohexylmethane-4,4'-diisocyanate in acetone and methyl glycol acetate. The foamable mixture thus prepared can be stored for 4 hours without foaming and becoming too viscous. By dipping threads into the foamable mixture and subsequently passing them through a heat-channel, it is possible to surround these threads with polyurethane foam of even thickness.

While certain representative embodiments and details have been shown for the purpose of illustrating this invention, it will be apparent to those skilled in the art that various changes and modifications may be made therein without departing from the spirit and scope of the invention.

What is claimed is:

1. Process for coating threads, ribbons, wires, fabrics, sheets and the like with a cellular polyurethane which comprises applying in a single step to the material to be coated a foamable mixture containing a polyhydroxy compound, water, and an organic polyisocyanate selected from the group consisting of dicyclohexylmethane-4,4'-diisocyanate, 1,4-cyclohexylene diisocyanate, hexamethylene diisocyanate, and blocked isocyanates prepared by reacting an organic polyisocyanate with a member selected from the group consisting of phenols, naphthols, oximes, imides, diphenyl amine, phenyl methyl pyrazolone, caprolactam, malonic acid esters, acetoacetic ester and acetylacetone, and subsequently subjecting the material coated with said mixture to a heat-treatment.

2. Process for coating threads, ribbons, wires, fabrics, sheets and the like with a cellular polyurethane which comprises dipping the article to be coated into a liquid foamable mixture containing a polyhydroxy compound, water and an organic polyisocyanate selected from the group consisting of dicyclohexylmethane-4,4'-diisocyanate, 1,4-cyclohexylene diisocyanate, hexamethylene diisocyanate, and blocked isocyanates prepared by reacting an organic polyisocyanate with a member selected from the group consisting of phenols, naphthols, oximes, imides, diphenyl amine, phenyl methyl pyrazolone, caprolactam, malonic acid esters, acetoacetic ester and acetylacetone, and subsequently heating the material coated with said mixture to a temperature of about 200° to about 300° C.

3. Process for coating threads, ribbons, wires, fabrics, sheets and the like with a cellular polyurethane which comprises applying to the article to be coated by means of a coating knife a foamable mixture containing a polyhydroxy compound, water and an organic polyisocyanate selected from the group consisting of dicyclohexylmethane-4,4'-diisocyanate, 1,4-cyclohexylene diisocyanate, hexamethylene diisocyanate, and blocked isocyanates prepared by reacting an organic polyisocyanate with a member selected from the group consisting of phenols, naphthols, oximes, imides, diphenyl amine, phenyl methyl pyrazolone, caprolactam, malonic acid esters, acetoacetic ester and acetylacetone, and subsequently heating the material coated with said mixture to a temperature of about 200° to about 300° C.

4. Process for coating threads, ribbons, wires, fabrics, sheets and the like with a cellular polyurethane which comprises applying to the article to be coated by means of a roller coater a foamable mixture containing a polyhydroxy compound, water and an organic polyisocyanate selected from the group consisting of dicyclohexylmethane-4,4'-diisocyanate, 1,4-cyclohexylene diisocyanate, hexamethylene diisocyanate, and blocked isocyanates prepared by reacting an organic polyisocyanate with a member selected from the group consisting of phenols, naphthols, oximes, imides, diphenyl amine, phenyl methyl pyrazolone, caprolactam, malonic acid esters, acetoacetic ester and acetylacetone, and subsequently heating the material coated with said mixture to a temperature of about 200° to about 300° C.

5. Process for coating threads, ribbons, wires, fabrics, sheets and the like which comprises applying in a single step to the material to be coated a foamable mixture containing a polyhydroxy compound, water, an acid chloride and an organic polyisocyanate selected from the group consisting of dicyclohexylmethane-4,4'-diisocyanate, 1,4-cyclohexylene diisocyanate, hexamethylene diisocyanate, and blocked isocyanates prepared by reacting an organic polyisocyanate with a member selected from the group consisting of phenols, naphthols, oximes, imides, diphenyl amine, phenyl methyl pyrazolone, caprolactam, malonic acid esters, acetoacetic ester and acetylacetone, and subsequently heating the material coated with said mixture to a temperature of between 200° and 300° C.

6. Process in accordance with claim 5 in which said foamable mixture contains 0.5 to 1.5 mol of polyisocyanate per gram equivalent of OH contained in said polyhydroxy compound, 0.5 to 10% by weight of water, 0.5 to 10% by weight of an emulsifier, 0.1 to 4% by weight of an accelerator and 0.5 to 1% of an acid chloride, said percentages being based on the weight of said polyhydroxy compound.

7. Process in accordance with claim 6, wherein said polyisocyanate comprises a mixture which comprises up to about 60% tolylene diisocyanate and a member selected from the group consisting of dicyclohexylmethane-4,4'-diisocyanate, 1,4-cyclohexylene diisocyanate, hexamethylene diisocyanate, and blocked isocyanates prepared by reacting an organic polyisocyanate with a member selected from the group consisting of phenols, naphthols, oximes, imides, diphenyl amine, phenyl methyl pyrazolone, caprolactam, malonic acid esters, acetoacetic ester and acetylacetone.

8. A process for coating threads, ribbons, wires, fabrics, sheets and the like which comprises applying in a single step to the material to be coated, a foamable mixture containing a polyhydroxy compound selected from the group consisting of hydroxyl polyesters obtained by the thermal esterification of polyhydric alcohols and polycarboxylic acids, isocyanate-modified polyesters containing terminal hydroxyl groups and prepared by reacting hydroxyl polyesters with from about 1 to about 5% of an organic diisocyanate, polyhydric polyalkylene ethers and polyhydric polythioethers; water and an organic polyisocyanate selected from the group consisting of dicyclohexylmethane-4,4'-diisocyanate, 1,4-cyclohexylene diisocyanate, and blocked isocyanates prepared by reacting an organic polyisocyanate with a member selected from the group consisting of phenols, naphthols, oximes, imides, diphenyl amine, phenyl methyl pyrazolone, caprolactam, malonic acid esters, acetoacetic ester, and acetylacetone, and subsequently heating the material coated with said mixture to a temperature of between 200° and 300° C.

9. A process according to claim 8 wherein said organic polyisocyanate is a mixture of up to about 60% tolylene diisocyanate and one of said group members.

References Cited in the file of this patent

UNITED STATES PATENTS

| | | |
|---|---|---|
| 2,650,212 | Windemuth | Aug. 25, 1953 |
| 2,657,151 | Gensel et al. | Oct. 27, 1953 |
| 2,729,618 | Muller et al. | Jan. 3, 1956 |
| 2,764,565 | Hoppe et al. | Sept. 25, 1956 |
| 2,826,526 | Meyerick et al. | Mar. 11, 1958 |
| 2,866,722 | Gensel et al. | Dec. 30, 1958 |
| 2,879,197 | Muskat et al. | Mar. 24, 1959 |

OTHER REFERENCES

"Polyurethanes," Dr. O. Bayer, February 28, 1946 (21 pages).